Feb. 6, 1945. J. L. M. S. BANKS 2,369,006
STRUCTURAL MATERIAL
Filed April 22, 1943   3 Sheets-Sheet 1

Inventor
J.L.M.S BANKS
By
Attorneys

Feb. 6, 1945. J. L. M. S. BANKS 2,369,006
STRUCTURAL MATERIAL
Filed April 22, 1943 3 Sheets-Sheet 2

Feb. 6, 1945. J. L. M. S. BANKS 2,369,006
STRUCTURAL MATERIAL
Filed April 22, 1943 3 Sheets-Sheet 3

Patented Feb. 6, 1945

2,369,006

UNITED STATES PATENT OFFICE 2,369,006

STRUCTURAL MATERIAL

John Leon Menzies Stone Banks,
Addlestone, England

Application April 22, 1943, Serial No. 484,114
In Great Britain October 27, 1941

1 Claim. (Cl. 154—28)

This invention relates to structural materials.

One object of this invention is to provide an improved material of very low specific gravity, combined with strength and excellent heat insulating properties.

Another object of the invention is to produce a light-weight material, suitable for use as an aircraft or like panel, from tubular elements that are readily available or cheaply produced.

A further object of the invention is to produce a rigid panel which can nevertheless easily be bent while being manufactured into an article.

A still further object is to provide a material which combines with specific gravity below unity the properties of structural strength and thermal insulation, and is therefore suitable for use in ship and boat construction, for the manufacture of lifebelts and other buoyant equipment for saving life at sea or for other constructional purposes where buoyancy is required.

In the invention use is made of a number of tubular elements, which are bonded together and assembled in various ways in accordance with the structure desired.

The invention is illustrated by the annexed drawings, in which

Figures 7 to 10 inclusive show diagrammatically various forms of buoyant material.

A structural panel may be formed from at least one layer of tubular elements arranged side by side and bonded together by an adhesive and presenting a substantially hexagonal or octagonal honeycomb-like structure in end view.

It is well known that cylindrical elements individually have the maximum ratio of strength to weight, but a panel that was composed of cylindrical elements arranged side by side would not be very strong because of the small area of contact over which bonding could take place. In panels according to the invention, there is a substantial area of bonding between the individual elements and the strength of the whole structure is very high for the total weight of material involved.

A useful panel may be made from a single layer, but it is preferred to build up the panel from two or more layers. To make a single layer elastically deformable cylindrical elements may first be coated with adhesive and placed side by side, and then pressure may be exerted transversely to the axes of the elements to urge them into close contact with one another. If adequate and equal pressures are applied in the two directions at right angles to the axes of the elements, the individual elements will tend to become substantially octagonal. Pressures in the two directions at right angles to the axes may be exerted simultaneously or successively, and in any case pressure should be maintained until the adhesive has set.

Figure 1:
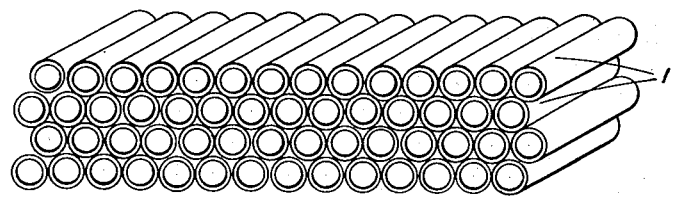
Figures 1 to 3 illustrate three stages in the production of a simple form of panel.
Figure 2:
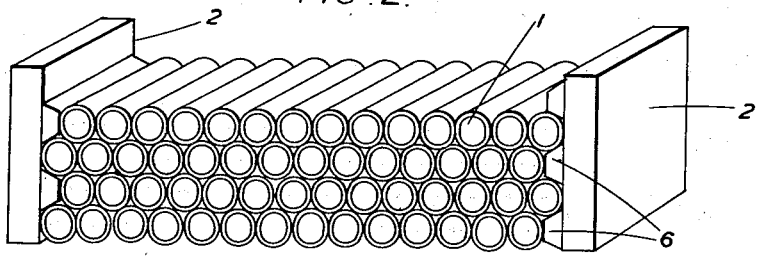
Figure 3:
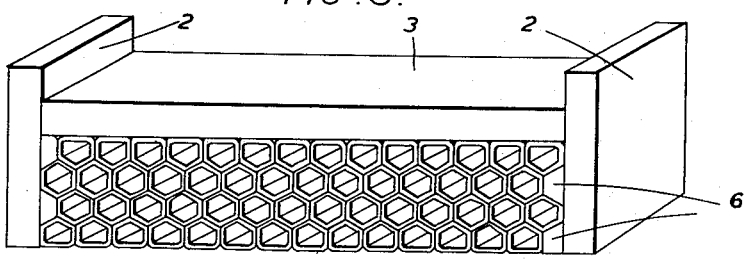
Figure 4:
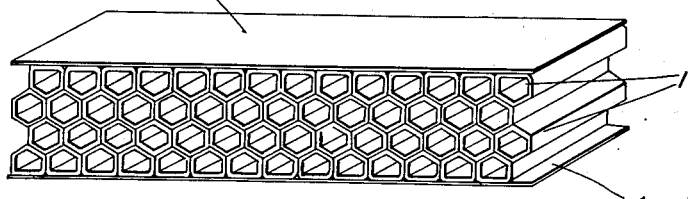
Figure 4 shows the resultant panel.

The production of one panel is illustrated in Figures 1 to 3. Four rows of tubular elements 1, adhesively coated, are built up as shown in Figure 1, with the elements in one row staggered relatively to those in the next. They are placed in a moulding jig having side members 2 as shown in Figure 2, and these side members are moved towards one another to effect the lateral compression. Any tendency of the layer to buckle, that is to say, of one or more elements to rise above the rest, can be resisted by hand or mechanical pressure. The lateral pressure serves to urge all the elements into close contact with one another and also to transform the circular cross-section shape of each element substantially into the shape of an ellipse having its minor axis parallel to the direction of the pressure. Loose semi-hexagonal ribs 6 are inserted into the spaces left at the ends of the rows as a result of the staggering of adjacent rows. If these ribs are omitted the compression may be such that the end elements in alternate rows are severely deformed so that the sides of the panels becomes substantially flat. When the elements have been deformed as shown in Figure 2, a top plate 3 is pressed down on the elements, as shown in Figure 3, with the result that the panel acquires a honeycomb-like structure. The pressure is maintained until the adhesive has set. Plane sheets 4 may be secured to each face as shown in Figure 4.

Figure 5:
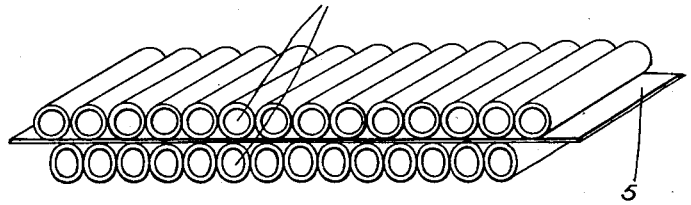
Figure 5 shows one stage in a modified process.

It may be desirable to act on each layer in turn, and in such a case stepped side members may be used to enable the lateral compression of the second and any subsequent layer to be effected without interfering with the layer or layers underneath. If the second and any subsequent layer is laterally compressed after the elements forming it have been placed on the layer below, spacing sheets, which may be, for example, of cellulose acetate, may be used to keep the layers apart during the lateral compression, as shown at 5 in Figure 5, where the lower row of elements have been converted into elliptical shape and the elements in the upper row are still tubular. Such sheets can easily be removed before the second deformation step, when the honeycomb-like structure is formed.

The elements used must, of course, be elastically deformable, and they may consist of straw, cane, bamboo, artichoke stems and so forth. Rubber may be used with advantage as tubes may easily be extruded from it in long lengths. The elements may also consist of paper or elastically deformable plastics. The adhesive may be any that is compatible with the material of the tubular element, e. g. glue, rubber solutions, bituminous bonding materials, synthetic cements, synthetic resin adhesives, and so forth. When paper elements are used, synthetic resins are particularly advantageous, as when they set they impart considerable strength to the tubular elements. The time during which the material must be allowed to set depends on the nature of the adhesive and on whether heat is used. It may vary from 24 hours in the cold to 2 hours or less under heat.

It will be observed from Figures 1 to 4 that by placing all the elements parallel to one another and staggering the elements in one layer relatively to those in the adjacent layers, the whole panel acquires a honeycomb-like structure. To ensure this, it is necessary that compressive forces having substantially equal resultants in the two directions at right angles to the axes are applied while the elements are still freely deformable, that is to say, before the adhesive sets. Then the elements in the multi-layer panel will tend to become substantially hexagonal. The fact that each cavity in such a structure in effect has a bonded double wall plays a considerable part in imparting high strength.

Figure 6:
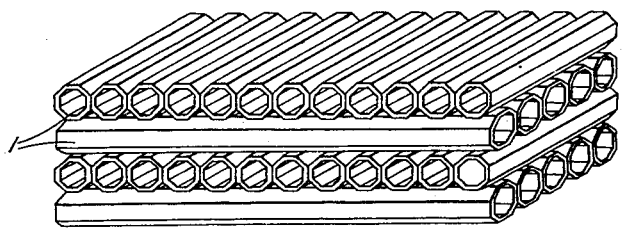
Figure 6 shows a further form of panel.

It is not essential for all the elements to be parallel to one another. The layers may be formed individually and then, if strength is required in a particular direction, the longitudinal axes of the elements in adjacent layers may be at any other angle up to 90° to one another. Figure 6 shows four layers of elements with the longitudinal axes of the elements in each row at right angles to those in the next. These layers are of course successively laterally compressed, but they may all be subjected to vertical pressure simultaneously through a single top plate. In either case they become substantially octagonal as shown, instead of hexagonal as in a panel in which all the layers are deformed together.

A plane sheet, such as 4, may be bonded to one or both faces of a panel to provide a smooth surface. This sheet may consist of paper, fabric, wood, metal, a plastic or any other convenient material. Again, instead of, or additional to, such a sheet either face or both faces of the panel may be coated with any suitable material to confer any added desirable property, for example, with a moisture-proof synthetic material, or rubber or ebonite, or a foamed or expanded material, and thereafter a further covering of a plane sheet may be added if desired.

Although panels may most simply be made in the form of flat boards or panels, they may be molded with curvature or into many different shapes by the use of appropriate jigs. If the elements are made of rubber or other material capable of taking a permanent set as a result of a curing or similar process, they may be formed into a flat structure in a semi-cured or semi-set condition, then moulded into a curved or other desired shape and finally cured or otherwise set in this shape. Moreover, although products of the invention may be essentially rigid in at least one direction they can be bent while articles are being made from them; in this respect and in their capacity for being worked some of the products resemble wood.

When a buoyant structure rather than a panel is required, the ends of the tubular elements are closed. This construction, which gives a number of wholly closed air-cells, allows the material to be of almost any desired shape. Even so, it is best to build up the material from layers in the way described above. A buoyant material may be made from cylindrical elements, but much greater strength and a very high ratio of strength to weight can be obtained by using elements that, being either hexagonal or triangular in cross-section, make contact over all their surface area with adjacent elements.

The tubular elements in a buoyant structure may all be of the same length, thus giving a material with parallel ends, or they may be of different lengths. In the latter case the material may have rounded or other shaped ends. Moreover, it is not necessary for each element to run from one end of the material to the other, as two or more closed elements may be placed end to end either directly in end contact with one another or with wholly closed spaces between them, thus reducing the risk of the material losing buoyancy if one or more of the elements should be punctured or otherwise damaged.

The ends of the elements may be closed by sheets of any suitable material, such sheet serving to seal some or all of the elements, but it is preferred to seal each end individually, and this may advantageously be done by means of flaps integral with the elements themselves.

Figure 7:
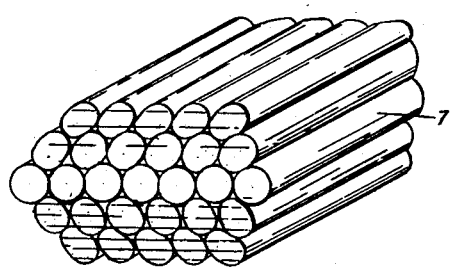
Figure 8:
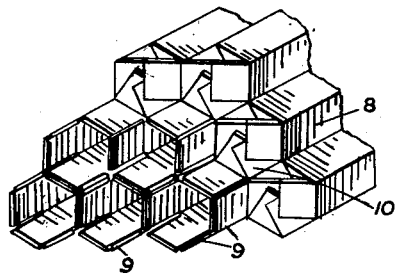

Figure 7 shows cylindrical elements 7 of different length bonded together. Each end of this material may be closed by a flexible sheet which serves to seal each element, or the ends of the elements may be individually sealed in the way shown in Figure 8. Here the elements 8 are hexagonal, but the sealing principle is not altered by this fact. The ends of the elements are slit axially to form a number of separate flaps 9, which are folded inwards onto one another as shown at 10 and secured by an adhesive.

Figure 9:
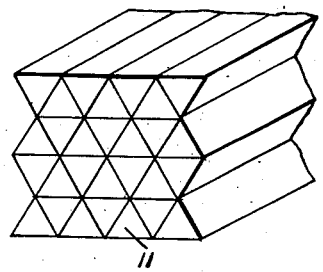

Figure 9 shows triangular elements 11 bonded by adhesive over the whole of the surface of each element.

Figure 10:
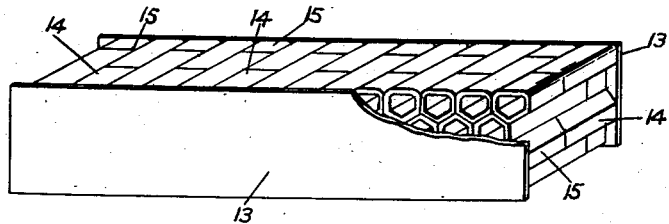

The strongest structure with the best ratio of strength to weight is given by hexagonal elements arranged in layers, with the elements in one layer staggered relatively to those in the next, as shown in Figure 4. It may be observed at this point that the elements in the top and bottom layers have their tops flattened, these elements having five sides instead of six sides as is the case of the elements of the intermediate layers. Figure 10 shows a material produced in the way illustrated by Figures 1 to 3 and having its ends sealed by rigid plane sheets 13, which may consist, for instance, of wood or a plastic, and which are secured by an adhesive. This figure also shows tubular elements placed end to end as well as side by side. It will be seen that each element of Figure 4 has been replaced by two elements, one of which, 14, is longer than the other, 15, and that the joints between these elements are staggered in laterally adjacent elements.

It is not necessary for the cells to contain only air at atmospheric pressure. If it is desired to produce a particularly light material the elements may be placed under partial vacuum or filled with a gas lighter than air before being sealed. Again, for some purposes, e. g. to ensure that a body formed from the material will remain in a specified attitude in water, a solid or liquid material may be placed in some or all of the cells.

I claim:

In the production of a panel for constructional purposes comprising a plurality of tubular elements arranged side by side of each other and in layers wherein the axes of the elements of each layer are at right angles with respect to the axes of the tubular elements of the adjacent layers, the method consisting in coating a plurality of elastically deformable tubular elements of circular cross-section with adhesive, arranging said elements side by side and in layers with the axes of the elements of each layer at right angles with respect to the axes of the elements of the next succeeding layer, and exerting pressure in two directions at right angles to each other with respect to each layer of tubular elements transversely to the axes of said elements to urge them into close contact with one another and to produce a substantially octagonal cross-sectional structure of each of the tubular elements, and effecting a bonding between substantially flat sides where they are in engagement.

JOHN LEON MENZIES STONE BANKS.